United States Patent
Maeda et al.

[11] 3,855,056
[45] Dec. 17, 1974

[54] PROCESS FOR PRODUCING SYNTHETIC PULP-LIKE MATERIALS AND PRODUCING SYNTHETIC PAPERS THEREFROM

[75] Inventors: Yo Maeda; Masao Asaoka; Toshiro Okamura; Sigenori Nagahama; Yutaka Yamaguchi; Ikuo Hoshi; Kiyoshi Takaki; Yorimitu Masubuchi, all of Shimodate; Haruo Iigaya, Yuki; Mineo Nakano, Hitachi, all of Japan

[73] Assignee: Hitachi Chemical Company, Ltd., Tokyo, Japan

[22] Filed: Mar. 17, 1970

[21] Appl. No.: 20,219

[30] Foreign Application Priority Data
Mar. 19, 1969 Japan.............................. 44-20358
Oct. 31, 1969 Japan.............................. 44-86844
Mar. 19, 1969 Japan.............................. 44-20359
Mar. 19, 1969 Japan.............................. 44-20360
Oct. 31, 1969 Japan.............................. 44-86842

[52] U.S. Cl.............. 162/157 R, 162/146, 162/206, 162/207, 264/146, 264/147, 264/154, 264/DIG. 47
[51] Int. Cl.............................................. D21h 5/12
[58] Field of Search........ 162/157 R, 146, 206, 207; 264/145, 146, 147, 154, DIG. 47

[56] References Cited
UNITED STATES PATENTS
| | | | |
|---|---|---|---|
| 2,336,797 | 12/1943 | Maxwell................... | 162/157 R UX |
| 3,097,991 | 7/1963 | Miller et al. ................... | 162/157 R |
| 3,099,067 | 7/1963 | Merriam et al............. | 264/DIG. 47 |
| 3,114,670 | 12/1963 | Iwasaki.............................. | 162/146 |
| 3,177,557 | 4/1965 | White.......................... | 264/DIG. 47 |
| 3,560,318 | 2/1971 | Miller et al. .................... | 162/157 R |
| 3,582,418 | 6/1971 | Schuur............................... | 264/147 |

FOREIGN PATENTS OR APPLICATIONS
39-5214  4/1964  Japan...............................  267/147

Primary Examiner—S. Leon Bashore
Assistant Examiner—William F. Smith
Attorney, Agent, or Firm—Craig & Antonelli

[57] ABSTRACT

Synthetic pulp-like materials are produced by forming into a film a mixed resin comprising at least one orientable thermoplastic resin and at least one thermoplastic resin incompatible or poorly compatible with said orientable resin, stretching the film at a temperature ranging from the softening point of the film to the melting point thereof or a temperature at which an apparent fluidity is shown, then cutting the resultant film in an adequate length to prepare flinders, and fibrillating the flinders by applying a mechanical force thereto.

Synthetic papers are produced by forming said synthetic pulp-like materials into the determined shape by paper-making, heating and pressurizing the resultant shaped article with or without treating the resultant shaped article with a liquid or gas having no ability of dissolving the orientable thermoplastic resin but having an ability of dissolving or swelling the thermoplastic resin incompatible or poorly compatible with said resin. These synthetic papers are excellent in mechanical properties as well as in writability and printability.

14 Claims, 2 Drawing Figures

PROCESS FOR PRODUCING SYNTHETIC PULP-LIKE MATERIALS AND PRODUCING SYNTHETIC PAPERS THEREFROM

The present invention relates to a novel process for producing a pulp-like material by use of a synthetic resin as the starting material and for producing a synthetic paper by use of said pulp-like material.

There have heretofore been studied the production of pulp-like materials to be used for the production of papers and the production of synthetic papers by use of a synthetic resin as the starting material in view of many excellent characteristics of synthetic resins. However, there has not yet been proposed a process satisfactory in performances and economic cost. As the cause thereof, it is considered that, firstly, there is a conspicuous difference in cost between the synthetic pulp and natural pulp and secondly, the mechanically strong interfelting between fine fibers is difficult to obtain when sheeted.

The first question is that synthetic resins themselves are expensive and pulp fibers comprising synthetic resins are prepared by cutting in an adequate length fibers obtained in accordance with a spinning process which is low in productivity. For solving the problem of cost, an improvement in productivity in the spinning process has mainly been investigated.

The second question is the problem fatal to synthetic resins. That is to say, natural pulps are beaten by a beater to be fibrillated to have branched fibers on the surface or at the end of pulp fibers. As a result, an interfelting between the pulp fibers is obtained, and therefore, a paper can have a wet strength. Accordingly, in paper-making by means of a Fourdriner type machine or cylinder type machine, the web or the water-laid sheet can be removed from the forming screen or the cylinder. Further, dried papers can have a sufficient strength, without particular use of a bonding agent, owing to said entanglement. Furthermore, the natural pulp fibers have a low elasticity in the wet state, give a sufficiently dense paper layer wherein the pulp fibers are compatible with one another in the papered state, and result in a dried fine paper having a high bulk specific gravity. On the contrary, pulp fibers prepared by use of synthetic resins as the starting material is difficult to fibrillate by said beating. Therefore, a wet strength cannot be imparted to the paper since there is substantially no interfelting between the pulp fibers. Accordingly, no paper can be obtained therefrom unless a particular bonding agent is used or the pulp is mixed with natural pulp. Further, even in the state of dried papers, the strength thereof has been relied solely upon the strength of the bonding agent or the natural pulps mixed at the time of papering.

The pulp fibers prepared from synthetic resins generally have high elasticity in the wet state except for polyvinyl alcohol fibers, and are not compatible with one another. Therefore, there has been obtained only a paper having a low bulk density, namely a coarse paper.

Further, the reason why a mechanically strong interfelting between fine fibers is not obtained at the time of papering the synthetic pulp fibers prepared from synthetic resins is considered to be that, unlike the natural pulps, the synthetic fibers are not only short in strength in the state of dried papers due to the mechanical interfelting originating from said fibrillation but have no strength due to the adhesion between the fibers originating from hydrogen bondings.

Various means have been provided for attaining adhesion in place of the hydrogen bonding. There have, for example, been proposed a process for utilizing the ability of unacetalated polyvinyl alcohol fibers being dissolved and adhered in the water-containing state in the case of Vinylon fiber, a process for sheeting a mixture of unacetalated polyvinyl alcohol fibers as an adhesive with other fibers, a process wherein a fusible resin is added in a fibrous or powdery form to fibers and the resulting mixture is papered, dried and then heat adhered, and a process for impregnating and coating fibers with a solution of an adhesive. Besides, there is adopted a process for making paper from a mixture of synthetic fibers with natural fibers to reinforcing the strength the synthetic fibers.

As means for solving the difficulty in the fibrillation of synthetic fibers as mentioned above, there have been investigated, for example, a process for beating and fibrillating polyvinyl alcohol fibers in the presence of a surface active agent under the condition of incomplete acetalation as disclosed in Japanese Patent Publication No. 8454/1958, a process for beating acrylic fibers in a diluted aqueous solution of a strong acid as disclosed in Japanese Patent Publication No. 19602/1963, a process for violently stirring Nylon, acrylic or polyester fibers in the presence of a swelling agent as disclosed in Japanese Patent Publication No. 10655/1964 and the like. However, any of said processes is not satisfactory. The most interesting process among the prior solving means is that disclosed in Japanese Patent Publication No. 9561/1960, the gist of which exists in extruding a mixture of at least two normally solid, mutually incompatible thermoplastic synthetic resins in the form of a monofilament having a certain continuous composition, drawing said monofilament during cold to orient it in the longitudinal direction, cutting the oriented monofilament into flinders and beating mechanically the resultant flinders in an inactive solvent. The resultant fibrous pulp is mixed with a natural fiber pulp for paper-making and then subjected to paper-making in accordance with a known process.

Even in said process, however, since there is adopted such a process lower in productivity as preparing monofilaments by an extruder, namely spinning, the aforedescribed first problem of cost has not been solved. Further, as a result of investigating said process, it has been found that the step of fibrillation requires a long period of time and characteristics of said fibrous pulp are not fully satisfactory in paper-making under the sole use thereof.

An object of the present invention is to provide a very economical process for producing a pulp-like material from synthetic resins, which material is suitable finally for paper-making and a process for producing a synthetic paper by use of said pulp-like material.

The present process for producing a pulp-like material from synthetic resins will first be explained hereinbelow.

The pulp-like material of the present invention is produced by forming into a film a mixed resin comprising at least one orientable thermoplastic resin and at least one thermoplastic resin incompatible or poorly compatible with said orientable thermoplastic resin, stretching the film at a film-stretchable temperature ranging from the vicinity of the softening point of the film to the melting point thereof or a temperature at which an apparent fluidity is shown to orient the molecules, then cutting film in an adequate length to prepare flinders and fibrillaing the resultant flinders by a mechanical force.

The pulp-like material thus obtained is fully fibrillated materials having a diameter of 50 microns or less and having fine branched fibers of several microns or less in diameter on the surface or at the end thereof, and excellent in the interfelting between the pulp fibers. The material has a wet strength sufficient for paper-making by a known paper machine without particularly requiring mixing with natural pulps.

A distinctive feature of the present invention consists in the finding that in the known process for obtaining a pulp-like material having branched fibers on the surface or at the end thereof disclosed in Japanese Patent Publication No. 9561/1960 wherein monofilaments of a mixed resin comprising two more poorly compatible thermoplastic resins is uniaxially stretched and flinders prepared by cutting said filaments are beaten, that the substitution of a film of said mixed resin for the monofilament is extremely effective for economically obtaining final pulp fibers excellent in characteristics. That is to say, the distinctive feature of the present invention resides in the finding that the production of film is much easier than that of monofilaments, namely spinning, and the stretching thereof is easy and very economical, and that the film is readily beaten, whereby pulp-like materials excellent in characteristics are obtained in a very short time as compared with uniaxially stretched monofilaments.

The present inventors have thought that the mechanism of the process for producing pulp-like materials from uniaxially stretched monofilaments of a mixture of thermoplastic resins poorly compatible with one another which is disclosed in Japanese Patent Publication No. 9561/1960 is as follows, and as a process for most effectively applying said mechanism, they have concluded that the use of film as the starting material is extremely efficacious.

That is to say, since the uniaxially stretched monofilaments are composed of thermoplastic resins which are poorly compatible with one another and kneaded mechanically in their molten state, it is considered that one component resin is dispersed in the other component resin in the form of particles having a relatively macroscopic size of from several hundred A to several microns and elongated in the stretched direction.

Therefore, said state is considered to be a state in which numerous interfaces of the different components having an adhesive force extremely smaller than the cohesion of each component resin are distributed in the monofilaments, in other words, a state at which interfaces or places capable of being readily split off by an external force (referred to hereinbelow as active points) are distributed in the monofilaments along the stretched direction.

In the case where flinders of the monofilaments wherein such numerous active points are distributed along the stretched direction are beaten in water, the external force given to the monofilaments is considered to affect concentrically the active points. Therefore, it is considered in the initial stage of beating that the flinders of the monofilaments become to have numerous fine split places therein, and when the external force is further continuously applied, these fine split places ran to be connected, whereby the flinders are finally separated into fibers and the places which are not completely connected to one another become branches of fibrils, namely fibrillated portions.

As is obvious from the above mechanism, the ease of fibrillation relies firstly upon the ease of the active points being split at the initial stage of beating and secondly upon the ease of the split places being connected to one another by the external force further applied.

The first point depends upon the ease of each flinder containing the active points being affected by the external force. It is needless to say that a film is liable to be affected by the external force as compared with monofilaments because of being large in the total area.

With respect to the second point, there is preferred flinders as thin as possible when the length is the same. That is to say, when the split places are less required to be connected in the direction of thickness and are only connected in the longitudinal direction, the fine fibers are apt to be removed from the flinders without cutting in the longitudinal direction. In such a case, there are obtained excellent pulp-like materials having a uniform length of fibers.

For attaining said purpose, a thin monofilament and a thin film are desired. However, the production of thin monofilaments is very difficult as compared with that of thin films, and further the monofilaments are difficult to accept the external force as described in the above first point, whereas the film is scarcely affected by the thickness on that occasion.

As mentioned above, it is very effective to uniaxially stretch a film of two or more thermoplastic resins poorly compatible with one another and then beat the stretched film.

Said fact is confirmed not only in beating in water but in defibering in air. That is to say, in the case of defibering by a mechanical force, film is far more favorable than monofilament.

The present invention will be further specifically explained hereinbelow.

The mixed resin comprising at least one orientable thermoplastic resin and at least one thermoplastic resin incompatible or poorly compatible with said orientable thermoplastic resin used in the present invention are, for example, mixtures comprising polyethylene and one or more members selected from polystyrene, polyvinyl chloride, polyvinylidene chloride, polyester, polyvinyl alcohol, polyvinyl acetate and the like; mixtures comprising polypropylene and one or more members selected from polystyrene, polyvinyl chloride, polyvinylidene chloride, polyester, polyvinyl alcohol, polyvinyl acetate and the like, and the like.

In these mixtures, it is considered that at least one component is incompatible or poorly compatible in the molten state and not miscible with the other unless a mechanical kneading action is applied thereto and, further the component is dispersed in the form of relatively macroscopic particles having a size of several hundred A to several microns even when the mechanical kneading action is applied.

As the mechanical kneading processes, there can be used various known processes which have widely been used for blending plastic materials. According to the present inventors' investigation, however, it has been found that it is sufficient that the starting resin pellets are directly fed to the hopper of an extruder and subjected to the kneading action between a cylinder and a screw of the extruder.

The extrusion into a sheet or film may be operable in accordance with any of the T-die process or tubular process, and apparatus therefor may be a conventional sheet or film extruder. The stretching temperature may be any temperature ranging from about the softening point of the film to the melting point thereof or a temperature at which the film shows apparent fluidity. However, considering the efficiency in the subsequent de-fibering step, conditions under which the stretching can be carried out at a stretching ratio as high as possible are desired. The thickness of film after stretched is preferably in the range of several ten microns to about 10 microns.

In the stretching, when films are stretched in the form of a bundle splits of films caused by pin-holes of films and defective portions due to incorporation of impurities are compensated by several films and a high stretching can be performed. The degree of stretching is closely concerned with the ease of de-fibering in the subsequent de-fibering step.

The uniaxially stretched film thus obtained is cut in an adequate length and de-fibered. The length of flinders of the film along the stretching direction is preferably same as the finally desired length of pulplike material, which is usually 0.2 to 5.0 cm.

The flinders of the uniaxially stretched film can be dispersed in water and beaten by a commercially available paper beater (if required, with an adequate dispersing agent such as carboxymethyl cellulose and the like). Further, in that case, there can also be substituted for the water a liquid inactive to the mixed resin composition, for example, a lower straight-chain alcohol, such as methanol, ethanol, butanol or the like, for mixtures of polyethylene, polypropylene and polystyrene. However, these known beaters such as Hollander beater, Jordan refiner and the like have such a mechanism that a strong shearing force, tension and the like are applied to the fibers when the fibers pass through between metal planes or metal planes extremely adjacent to one another. Such a mechanism has also an action of cutting the fibers in the longitudinal direction on the way of fibrillation. Accordingly, where the present uniaxially stretched film is beaten, there is desired a process where in a water stream is caused by high speed rotating blades (the linear velocity at the end of blade: 5 to 100 m./sec.) to give impact to the film. According to this process, the purpose of beating can be achieved in a period of several minutes to ten several minutes.

The present inventors consider the mechanism of beating a film as follows: When the minimum external force sufficient to cut and tear a film by applying an external force in parallel to the stretched direction is defined as $\sigma_{\parallel}$, and the minimum external force necessary for tearing the film by applying an external force in the direction perpendicular to the oriented direction is defined as $\sigma_{\perp}$, the relation of $\sigma_{\parallel} > \sigma_{\perp}$ is established in the oriented film and this relation means the splitting property of the film. Therefore, for fibrillating the oriented film by applying an external force thereto at random, it is obvious that an external force $\sigma$ in the relation of $\sigma_{\parallel} > \sigma > \sigma_{\perp}$ must be applied thereto. If said external force $\sigma$ is in the relation of $\sigma > \sigma_{\parallel}$, the cutting action is caused even in the stretched direction and if the same is in the relation of $\sigma_{\perp} > \sigma$, the tearing action is not caused.

However, since the beating mechanism of the prior beaters for natural pulps gives at random an external force such as tension, pressure, shearing force and the like in such a manner as grinding pulps by a narrow gap (less than 100 microns in many cases) between metals or metal and stone, said external force acts as cutting the uniaxially stretched thermoplastic resins rather than fibrillating the same. That is to say, an external force $\sigma$ in the relation of $\sigma > \sigma_{\parallel}$ acts, which is not necessarily favorable for beating.

As mentioned above, the mechanism capable of applying an external force $\sigma$ in the relation of $\sigma > \sigma_{\parallel}$ such as in the known beaters is not suitable for beating the uniaxially stretched thermoplastic resins, and a mechanism capable of applying an external force $\sigma$ in the relation of $\sigma_{\parallel} > \sigma > \sigma_{\perp}$ is far preferred.

Considering said relation, it is preferred to beat the flinders of a uniaxially stretched resin film in water or in an inactive liquid by use of a vessel having rotating blades in which a space between the blades and a space between the blade and the wall of the vessel are more than 1 mm, and the velocity at the end of the blade is more than 5 m./sec. When the velocity at the end of the rotating blade is more than 5 m./sec. and in the range capable of being usually worked, the force $\sigma$ for giving impact to flinders of uniaxially stretched thermoplastic resin film in water or in an inactive liquid is sufficiently smaller than the foregoing force $\sigma_{\parallel}$ and sufficiently larger than the force $\sigma_{\perp}$. Further, when a space of more than 1 mm. is provided between the rotating blades and the wall of the vessel, the force caused by friction between the flinders and the wall of the vessel or by viscosity resistance between the flinders and water or an inactive liquid does not exceed $\sigma_{\parallel}$ even if the flinders are occasionally rotated along with the blades after being impacted. By use of said beater, the flinders of the film are split but difficult to cut in the longitudinal direction.

Further, the film can not only be beaten in a liquid but also de-fibered in air by applying a mechanical force.

The synthetic fiber pulp thus obtained is similar in structure to natural pulps and has a structure wherein fibers have the desired length and a thickness of less than several ten microns and also have branched fibers having a thickness of less than several microns. Paper-making of the resultant synthetic pulp in accordance with a known process, there can be obtained a paper excellent in surface state and printability, without requiring any mixing with natural pulps.

The pulp-like material thus obtained can be utilized in many fields such as not only for paper-making, but also for the production of non-woven fabrics, base materials for artificial leathers, filters, adsorbents, paddings, twisted yarns and the like.

Here, the process for producing a synthetic paper by use of said pulp-like material will be explained.

The whole outer-surface of short fibers fibrillated in the afore-described manner is not covered with the oriented and fibrillated thermoplastic resin but has adhered thereto numerous small lumps of the other component resin, namely has traces of the active points. Accordingly, said portion is readily dissolved in or swollen with a liquid or a gas capable of dissolving or swelling the other component resin. That is to say, by treating a paper-like material having the determined shape prepared from the foregoing fibrillated short fibers in accordance with such a means as paper-making and the like with the afore-described liquid or gas which has a dissolving or swelling ability, or by additionally pressurizing or heat-pressurizing the resultant paper-like material where a highly dense, strongly bonded paper is intended to be obtained, the fibers are fixed at intersections by the dissolved or swollen resin.

Further, even by preparing a paper-like material having the determined shape from the pulp-like material by such a means as paper-making and the like and heating and pressurizing the resultant paper-like material at a temperature lower than the melting point of at least one orientable thermoplastic resin but higher than the softening point of the resin incompatible or poorly compatible with said resin, or after heating and pressurizing, by applying to the resultant material a solvent having no ability of dissolving at normal temperature at least one orientable thermoplastic resin but having an ability of dissolving the resin incompatible with said resin, a synthetic paper can be obtained. All of these processes are applicable to the case of producing non-woven fabrics, base materials for artificial leathers, filters, adsorbents, paddings and twisted yarns by use of the present pulp-like material.

As mentioned above, in the present invention, the paper-like material having the determined shape is prepared from the pulp-like material by such a means as paper-making and the like and then the resultant paper-like material is treated with a liquid or a gas having no ability of dissolving at least one orientable thermoplastic resin but having an ability of dissolving or swelling the resin incompatible or poorly compatible with said resin. For example, where the former resin is polyethylene or polypropylene and the latter resin is polystyrene, a treatment is made with one or more ketones, aliphatic hydrocarbons, halogenated aliphatic hydrocarbons, aromatic hydrocarbons, halogenated aromatic hydrocarbon esters, ethers and the like, or with a mixture thereof with water, alcohols and the like which are non-solvents. As the procedures of the treatment with a liquid or a gas having a dissolving or swelling ability, there are available dipping, spraying, other coatings, passing through a gaseous atmosphere and the like. For obtaining particularly solid, highly dense papers or paper-like materials, a further pressurizing and heating is required. When the pressure is low at the time of pressurizing, lowly dense, highly opaque papers are obtainable, while when the pressure is high, the highly dense papers are obtainable, and in the case of extremely high pressure, the lowly opaque papers are obtainable.

Further, the process for only pressurizing and heating at a temperature lower than the melting point of at least one orientable thermoplastic resin in the synthetic pulp-like material but higher than the softening point of the resin incompatible or poorly compatible with said resin is advantageous because it is rich in productivity and has no fear of causing fires. However, papers or paper-like materials to which a high pressure is applied for obtaining a high bonding power have a tendency of becoming transparent and are liable to be unsuitable for printing papers. On the contrary, the process for the treatment with the solvent after heating and pressurizing results in paper-like materials strong in bonding power which are suitable for printing papers without impairing the opacity since it is possible to lower the pressure and temperature at the time of pressurizing and heating for the reason why the solvent acts on intersections of the fibers which have been made dense by heating and pressurizing to dissolve the resin and increase the bonding power at the intersections.

As explained above, according to the present invention, there is readily obtained a uniform strong bonding between the fibers without particularly requiring the addition of an adhesive as in the prior process and without fearing of the ununiformity at the time of addition.

The present invention will be further explained with reference to the following examples.

EXAMPLE 1

A commercially available polypropylene (film grade) and a commercially available polystyrene (for general purpose) were fed to the hopper of an extruder in a ratio of 80 : 20 and extruded into a film having a width of 900 mm. and a thickness of 200 microns. The resultant film was uniaxially stretched by eight to nine times at 120° to 125°C. and maintained at that temperature for about 1 minute to obtain a uniaxially stretched mixed film having a final thickness of 60 microns. The film was cut in a length of 10 mm. and then fed to a beater at a rate of 2 to 4 g. per 800 g. of water and beaten. The beater had an internal volume of 1,000 cc. and a cylindrical structure wherein four blades having a distance between the ends of 6 cm. are rotated at 10,000 r.p.m. at the bottom section. Operating said stirrer for 5 to 15 minutes, there was obtained synthetic fiber pulp having a diameter of 40 to 10 microns and enriched with branched fibers having a diameter of several microns or less.

Figure 1:
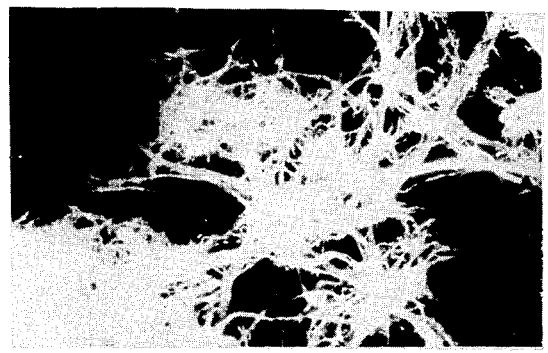
FIG. 1 is an enlarged photograph showing a pulp-like material obtained in accordance with the present process.
Figure 1:
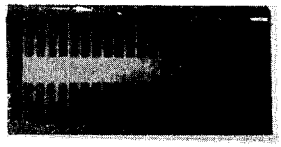

The photograph of FIG. 1 is a microscopic photgraph of said pulp.

The resultant synthetic fiber pulp was sheeted by a commercially available exterimental paper machine by use of carboxymethyl cellulose as a dispersing agent to result in the good wet strength.

Figure 2:
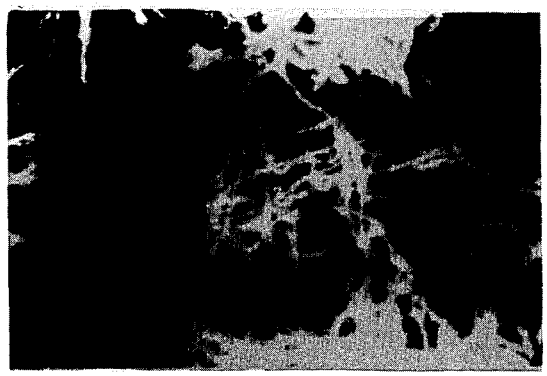
FIG. 2 is an enlarged photograph showing a conventional natural pulp prepared by heating.

Further, by press-drying the paper at 80°C. under a pressure of 3.5 to 4 Kg./cm$^2$ for several minutes, there was obtained a synthetic paper having a smooth surface. FIG. 2 is a microscopic photograph showing a beaten natural pulp which has been used. As is obvious from the comparison between the two photographs, the synthetic fiber pulp obtained in accordance with the present invention is excellent in the fibrillation.

EXAMPLE 2

In the same manner as in Example 1, a mixed film was prepared from a commercially available polypropylene (film grade) and a commercially available high impact polystyrene at a rate of 70 : 30 and beaten, whereby the favourable result same as in Example 1 was obtained

EXAMPLE 3

A film was prepared in the same manner as in Example 1 by use of 90 parts by weight of a commercially available high density polyethylene and 10 parts by weight of a commercially available polystyrene for general use, stretched by about 10 times at 90°C. and then beaten in the same manner as in Example 1. Thus, the favourable result same as in Example 1 was obtained.

EXAMPLE 4

A film having a thickness of 40 microns and comprising 70 parts by weight of a high density polyethylene and 30 parts by weight of a commercially available polystyrene for general use was uniaxially stretched by 10 times at 100°C., and then flinders of the film were prepared in the same manner as in Example 1. Beating the resultant flinders being fed to a beater at a rate of 2 g. per 800 g. of water in which six rotating blades having a distance at the ends of 6 cm. were rotate at 9,000 r.p.m. in a cylinder having a diameter of 10 cm. and an obstructive plate, there was obtained the favourable result same as in Example 1.

EXAMPLE 5

A commercially available polypropylene (film grade) and a commercially available polystyrene (for general purpose) were fed to the hopper of an extruder at a ratio of 80 : 20 and extruded into a film having a thickness of 40 microns. The resultant film was uniaxially stretched by 15 times at 150°C. The film was cut in a length of 10 mm. and then fed to a beater at a rate of 2 g. per 800 g. of water and beaten therein. The beater had an internal volume of 1,000 cc. and a cylindrical structure wherein four blades having a distance at the ends of 6 cm. were rotated at about 10,000 r.p.m. at the bottom section. By stirring for 5 to 15 minutes, there were obtained short fibers having a thickness of about 40 to 10 microns and enriched with branched fibers having a thickness of several microns or less.

The resultant short fibers were papered by a commercially available experimental paper machine to prepare a paper having a basis weight of 100 g./m². After drying the resultant paper-like material was spray-coated with methyl ethyl ketone at a rate of 30 g./m² and then heated at 60°C. under a pressure of 2 Kg./cm² for 3 minutes. The resultant paper had a smooth surface, and tearing and tensile strengths equal to or higher than those of a high quality paper and was acceptable for writing with pencils, fountain pens, ball pens and for printing with a printing ink.

EXAMPLE 6

A paper-like material prepared by paper-making and drying in the same manner as in Example 5 was impregnated uniformly with acetone and heated and pressurized in the same manner as in Example 5, whereby there was obtained a paper having high whiteness and a high strength.

EXAMPLE 7

A paper-like material prepared by paper-making and drying in the same manner as in Example 5 was impregnated uniformly with a liquid comprising methyl ethyl ketone and ethanol at a rate of 50 : 50, and then heated and pressurized in the same manner as in Example 5, whereby there was obtained a paper having high whiteness and a high strength.

EXAMPLE 8

A paper-like material prepared by paper-making and drying in the same manner as in Example 5 was impregnated uniformly with benzene, and then dried without heating and pressurizing, whereby there was obtained a paper somewhat lower in density, coarse in surface and good in strength.

EXAMPLE 9

A paper-like material prepared by paper-making and drying in the same manner as in Example 5 was exposed to a benzene vapor atmosphere for 5 minutes. Thereafter, the absorbed benzene was evaporated, to obtain a paper similar to that in Example 8.

EXAMPLE 10

A film having a thickness of 30 microns was prepared by extruding a mixture comprising 70 parts by weight of a high density polyethylena and 30 parts by weight of polystyrene for general purpose. The film was stretched by seven times at 110°C. and then treated in the same manner as in Example 1 to obtain short fibers.

The resultant short fibers were papered and dried to make a paper having a basis weight of 100 g./m² in the same manner as in Example 5. Thereafter, the paper was uniformly impregnated with acetone and then heated at 50°C. under a pressure of 3 Kg./cm², whereby there was obtained a paper high in strength and smooth in surface.

EXAMPLE 11

In the same manner as in Example 10, a paper was made and then impregnated uniformly with methyl ethyl ketone in the incomplete drying state and heated and pressurized in the same manner as in Example 10, whereby a favourable paper was obtained.

EXAMPLE 12

70 parts by weight of polypropylene (Chisso 1077) and 30 parts by weight of GP polystyrene (Styrone 666), were dry-blended and formed into a film having a thickness of about 40 microns by an extruder having a diameter of 65 mm., stretched by eight times at 120°C., cut in a length of 20 mm. in the direction perpendicular to the stretched direction and de-fibered along with water to obtain fibrillated synthetic fiber pulps.

The resultant pulps were dispersed in a 2 percent aqueous solution of C.M.C. and subjected to paper-making by a hand sheet machine to obtain an un-bonded paper having a basis weight of 100 g.

The resultant unbonded paper was heated for 5 minutes under the following conditions. The result is as shown in Table 1.

Table 1

| No. | Temperature °C. | Pressure Kg./cm² | Tensile strength | Result Opacity | Others |
|---|---|---|---|---|---|
| 1 | 100 | 30 | 0.4 Kg./cm | 98 | |
| 2 | 100 | 50 | 0.5 do. | | |
| 3 | 100 | 120 | 0.8 do. | 95 | |
| 4 | 110 | 30 | 0.7 do. | 97 | |
| 5 | 110 | 50 | 0.7 do. | 97 | |
| 6 | 110 | 120 | 1.1 do. | 92 | partially transparent |
| 7 | 120 | 30 | 0.9 do. | 96 | |
| 8 | 120 | 120 | 2.0 do. | 86 | partially transparent |
| Control | unbonded paper | | 0.05 do. | 99 | |

EXAMPLE 13

A film was prepared in the same manner as in Example 12 from 60 parts by weight of polyethylene (Showrex 6050) and 40 parts by weight of GP polystyrene (Styrone 666). The film was stretched at 100°C. until just before the cutting and then beaten to prepare fibrillated synthetic fiber pulps.

An unbonded paper was obtained in the same manner as in Example 12 from said pulps and heated the unbonded paper at 100°C. under a pressure of 120 Kg./cm² to obtain a bonded paper having a tensile strength of 1 Kg./cm and somewhat transparent.

EXAMPLE 14

Synthetic fiber pulps obtained in the same manner as in Example 12 was blended with broad-leaved tree pulps (Canadian freeness value: 275) at a rate of 7 : 3 and the resultant mixture was subjected to paper-making in the same manner as in Example 12 to obtain an unbonded paper having a basis weight of 100 g. The result obtained by heating and pressuring is as shown in Table 2.

Table 2

| No. | Temperature °C | Pressure Kg./cm² | Result Tensile strength | Opacity |
|---|---|---|---|---|
| 1 | 100 | 50 | 0.7 Kg./cm | 97 |
| 2 | 100 | 80 | 1.0 do. | 97 |
| 3 | 100 | 120 | 1.2 do. | 96 |
| 4 | 110 | 50 | 0.7 do. | 97 |
| 5 | 110 | 80 | 0.9 do. | 94 |
| 6 | 110 | 120 | 1.2 do. | 94 |
| 7 | 120 | 50 | 1.6 do. | 97 |
| 8 | 120 | 120 | 2.0 do. | 94 |
| Control | unbonded paper | | 0.05 do. | 98 |

EXAMPLE 15

Synthetic fiber pulps were prepared from 70 parts by weight of polypropylene (Chisso 1077) and 30 parts by weight of a high impact polystyrene (Styrone 475) and subject to paper-making to obtain an unbonded paper having a basis weight of 100 g. The resultant unbonded paper was heated at 110°C. under a pressure of 30 Kg./cm² and then exposed to a saturated toluene gas at a certain temperature for a certain time to absorb the solvent gas and bond the fiber pulps by dissolving and fusing the resin at intersections of pressurizing pulps. Thereafter, the product was dried in air at 70°C. to remove the solvent, whereby a bonded paper was obtained. The result is as shown in Table 3.

EXAMPLE 16

A heated and pressurized paper obtained in the same manner as in Example 15 was rapidly passed through a benzene liquid and then dried at 70°C. to obtain a paper having a tensile strength of 2.5 Kg./cm and an opacity of 95.

EXAMPLE 17

A mixture of 80 parts by weight of synthetic fiber pulps obtained in the same manner as in Example 17 and 20 parts by weight of wood pulps (broad-leaved tree pulp, freeness value: 275) was subjected to paper-making to obtain an unbonded paper having a basis weight of 100 g. The resultant unbonded paper was heated at 110°C. under a pressure of 30 Kg./cm², then maintained in a saturated toluene gas at a gaseous temperature of 80°C. for 5 minutes and dried at 60°C., to obtain a paper having a tensile strength of 4 Kg./cm and an opacity of more than 96 percent.

In addition, a paper heated and pressurized without treating with a solvent gas had a tensile strength of 0.7 Kg./cm and an opacity of more than 95 percent.

What we claim is:

1. A process for producing a pulp-like material, which comprises forming into a film a mixed resin comprising at least one orientable thermoplastic resin and at least one thermoplastic resin incompatible or poorly compatible with said orientable thermoplastic resin, highly stretching the resultant film at a temperature ranging from the softening point of the film to the melting point thereof, then cutting the resultant stretched film to a length of 0.2 to 5cm in the stretch direction to form flinders, and then fibrillating the flinders in an inactive liquid by applying a mechanical force to said flinders with a paper beater means.

2. A process according to claim 1, wherein several films are formed into a bundle and the bundle is highly stretched.

3. A process according to claim 1, wherein said paper beater means comprises a vessel having rotating blades in which the distance between the blades and the distance between a blade and the wall of the vessel are more than 1 mm and in which the velocity at the end of each blade is more than 5 m./sec.

4. A process according to claim 1, wherein the mixed resin is a combination of polyethylene and at least one member selected from the group consisting of polystyrene, polyvinyl chloride, polyvinylidene chloride, polyester, polyvinyl alcohol and polyvinyl acetate, or a combination of polypropylene and at least one member Table 3

| No. | Solvent gas exposing condition Gas temperature/exposed time | | % by weight of absorbed gas to pulps | Result Tensile strength | Opacity | Others |
|---|---|---|---|---|---|---|
| 1 | 75 to 77°C. | /5 minutes | 14 | 2.8 Kg./cm | more than 95 % | |
| 2 | do. | /10 minutes | 25 | 3.3 do. | do. | |
| 3 | 80 to 82°C. | /2 minutes | 10 | 4.2 do. | do. | |
| 4 | do. | /5 minutes | 30 | 4.8 do. | do. | |
| 5 | do. | /20 minutes | 60 | 2.9 do. | do. | |
| 6 | 95 to 97°C. | /2 minutes | 50 | — | — | Shrinkage of fiber pulps occurred |
| Control | untreated | | 0 | 0.8 do. | more than 95 % | | selected from the group consisting of polystyrene, polyvinyl chloride, polyvinylidene chloride, polyester, polyvinyl alcohol and polyvinyl acetate.

5. A process according to claim 1, wherein the resultant film is stretched at least seven times its length.

6. A process according to claim 5, wherein the resultant film is stretched from seven to 15 times its length.

7. A process according to claim 1, wherein said inactive liquid is water.

8. A process for producing a synthetic paper, which comprises forming a pulp-like material obtained in accordance with claim 1 into the determined shape by such a means as paper-making and the like, and treating the resultant shaped article with a gas which has no ability of dissolving at least one orientable thermoplastic resin but has an ability of dissolving or swelling the thermoplastic resin incompatible or poorly compatible with said resin.

9. A process according to claim 8, wherein heating and pressurizing are effected after the treatment with the gas.

10. A process for producing a synthetic paper, which comprises forming a pulp-like material obtained in accordance with claim 1 into the determined shape by such a means as paper-making and the like, and heating and pressurizing the resultant shaped article at a temperature lower than the melting point of at least one orientable thermoplastic resin but higher than the softening point of the thermoplastic resin incompatible or poorly compatible with said resin.

11. A process according to claim 10, wherein, after heating and pressurizing, the shaped article is treated with a liquid which has no ability of dissovling at least one orientable thermoplastic resin but has an ability of dissolving or swelling the thermoplastic resin incompatible or poorly compatible with said resin.

12. A process according to claim 10, wherein, after heating and pressurizing, the shaped article is treated with a gas which has no ability of dissolving at least one orientable thermoplastic resin but has an ability of dissolving or swelling the thermoplastic resin incompatible or poorly compatible with said resin.

13. A process for producing a synthetic paper, which comprises forming a pulp-like material obtained in accordance with claim 1 into the determined shape by such a means as paper-making and the like, and treating the resultant shaped article with a liquid which has no ability of dissolving at least one orientable thermoplastic resin but has an ability of dissolving or swelling the thermoplastic resin incompatible or poorly compatible with said resin.

14. A process according to claim 13, wherein heating and pressurizing are effected after the treatment with the liquid.

* * * * *